F. W. LEYLAND AND E. P. BROCK.
MACHINE FOR COOLING CHOCOLATES AND THE LIKE.
APPLICATION FILED FEB. 9, 1920.
1,389,887.
Patented Sept. 6, 1921.
4 SHEETS—SHEET 3.
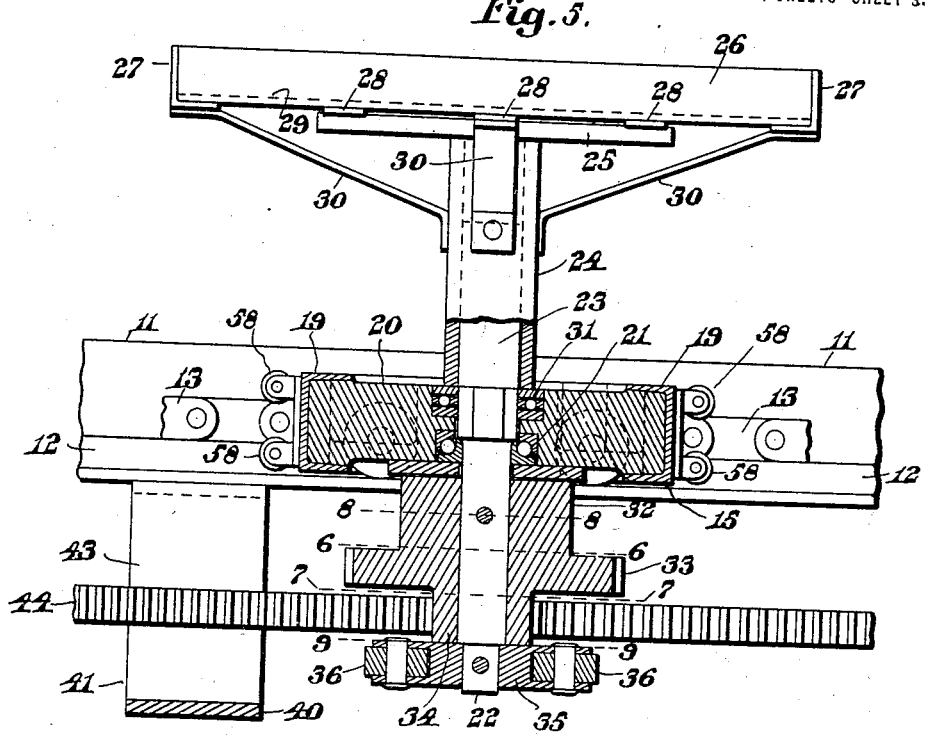
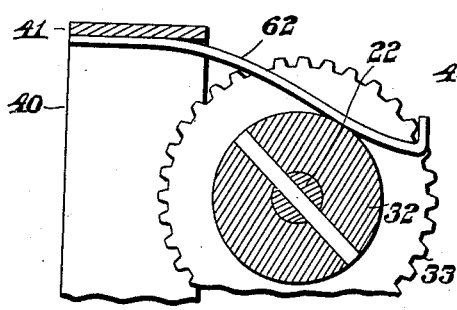
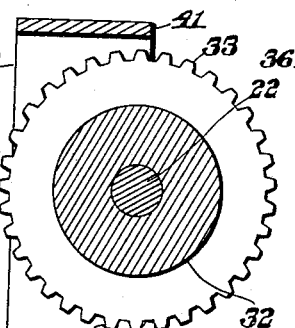
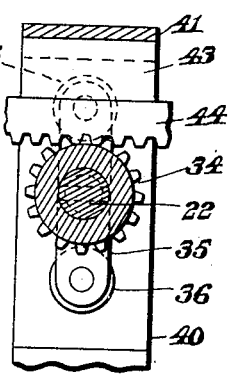
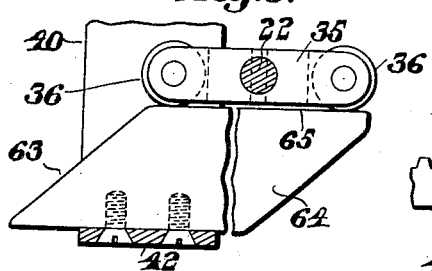
Inventors:
Frederick W. Leyland,
Edward P. Brock,
by Walter E. Lombard, Atty.

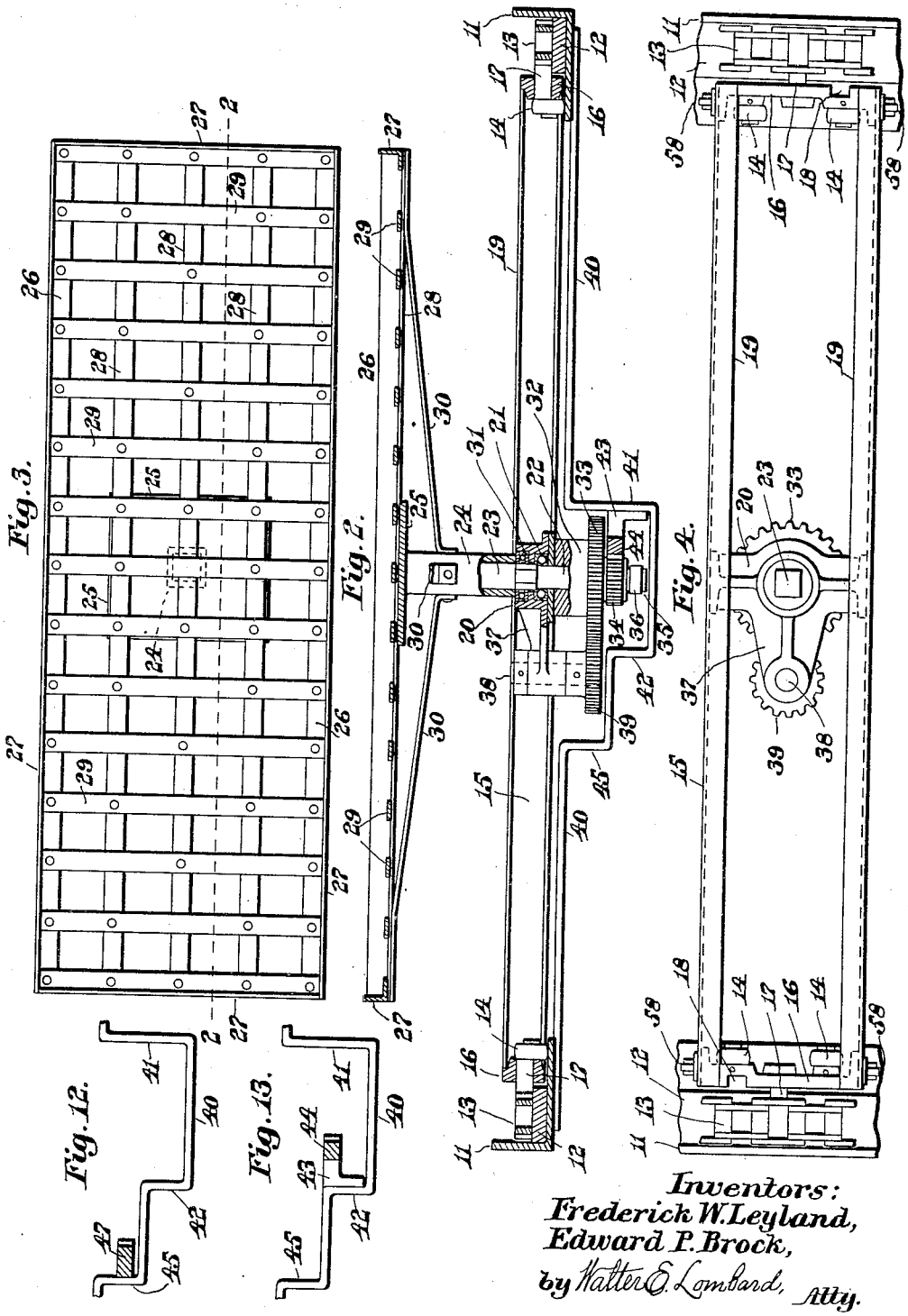

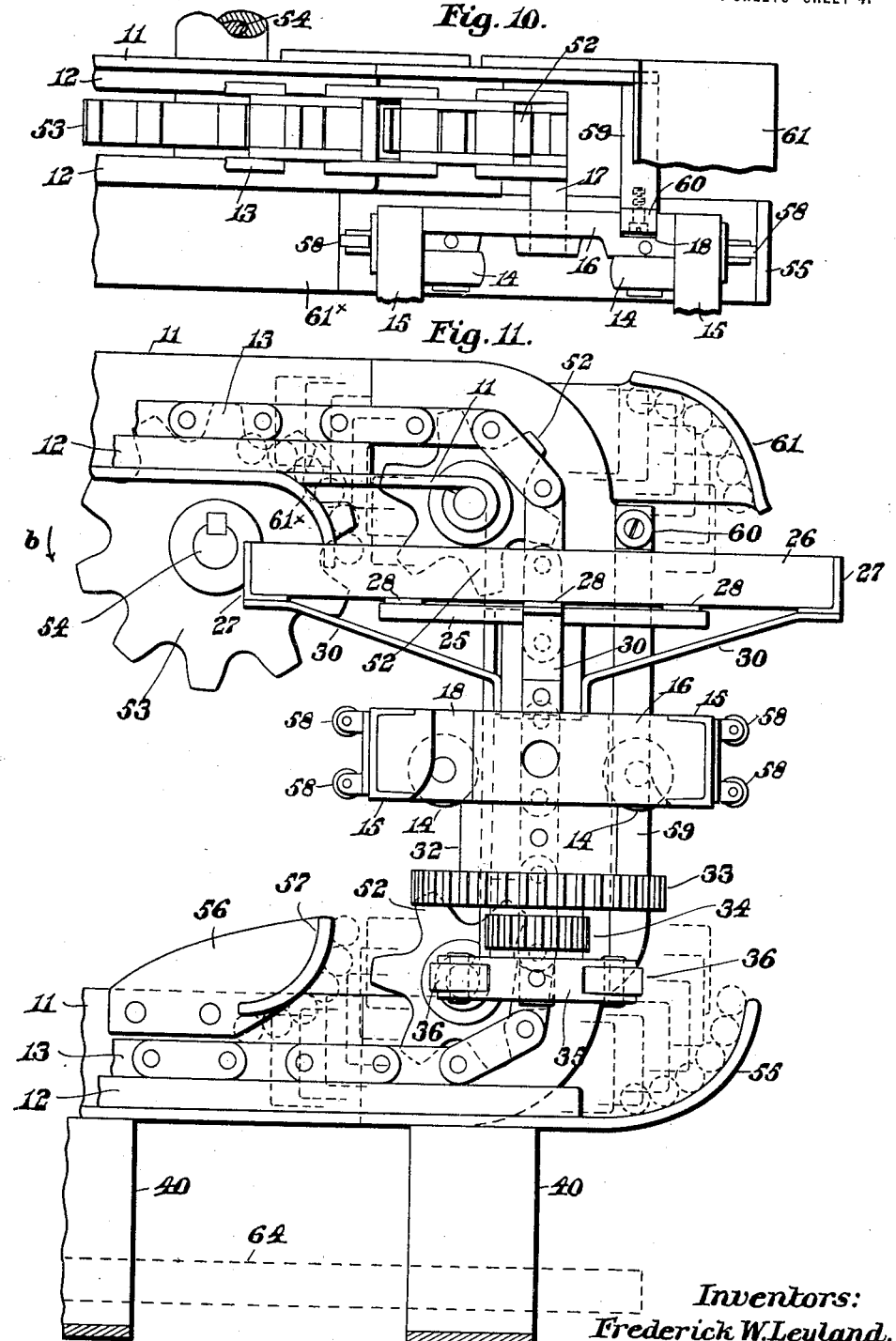

UNITED STATES PATENT OFFICE.

FREDERICK W. LEYLAND, OF CAMBRIDGE, AND EDWARD P. BROCK, OF BOSTON, MASSACHUSETTS.

MACHINE FOR COOLING CHOCOLATES AND THE LIKE.

1,389,887. Specification of Letters Patent. Patented Sept. 6, 1921.

Application filed February 9, 1920. Serial No. 357,361.

*To all whom it may concern:*

Be it known that we, FREDERICK W. LEYLAND, a citizen of the United States of America, and a resident of Cambridge, in the county of Middlesex and Commonwealth of Massachusetts, and EDWARD P. BROCK, a citizen of the United States of America, and a resident of Boston, in the county of Suffolk and Commonwealth of Massachusetts, have invented certain new and useful Improvements in Machines for Cooling Chocolates and the like, of which the following is a specification.

This invention relates to machines for cooling chocolates, confections, and the like, the object of the invention being to provide a machine of this class which will occupy less floor space than the machines now in general use and in which the material may be cooled more rapidly.

The invention consists in providing the confection-supporting trays with means for rotating them during their travel in a horizontal path.

The invention further consists in a revoluble tray adapted during its travel to be rotated at varying speeds.

The invention further consists in means for maintaining the trays horizontal while being moved from tracks on one level to tracks on another level.

The invention further consists in means for retarding the rotation of the revoluble trays and registering them in a predetermined position preparatory to their vertical movement from one level to another.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Fig. 2 represents a transverse section of a portion of the same showing the tracks of one level with carriage and tray supported thereby.

Fig. 3 represents a plan of the tray.

Fig. 4 represents a plan of the tray-supporting carriage and portions of the endless conveyer chains for moving it.

Fig. 5 represents a transverse vertical section of a carriage and tray and showing portions of the carriage-supporting tracks and the means for rotating the tray.

Fig. 6 represents a horizontal section on line 6, 6, on Fig. 5.

Fig. 7 represents a horizontal section on line 7, 7, on Fig. 5.

Fig. 8 represents a horizontal section on line 8, 8, on Fig. 5.

Fig. 9 represents a horizontal section on line 9, 9, on Fig. 5.

Fig. 10 represents a plan of one end of one of the tracks, the conveyer chain, and tray-supporting carriage.

Fig. 11 represents a vertical section of a portion of one end of the machine and showing the devices for maintaining the carriage horizontal while being moved from one level to another, and Figs. 12 and 13 represent sectional details to be hereinafter described.

Similar characters indicate like parts throughout the several figures of the drawings.

Figure 1:
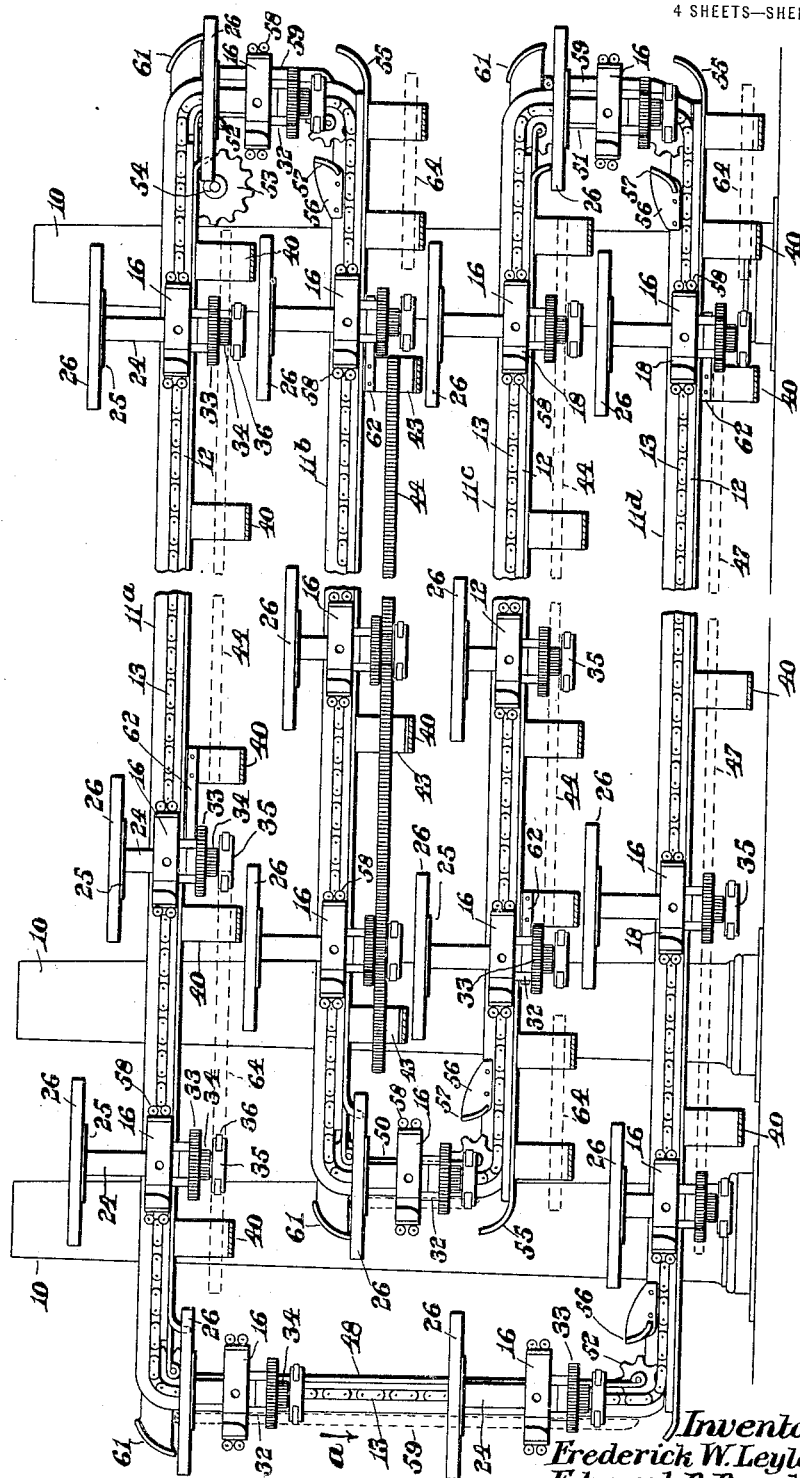
Figure 1 represents a longitudinal vertical section of a machine embodying the principles of the present invention.

In the drawings, 10, 10 are a plurality of posts preferably secured rigidly to the floor of a building and in two parallel lines.

On the inner sides of each line of the posts 10 are secured a plurality of angle bars $11^a$, $11^b$, $11^c$, and $11^d$ at various levels as indicated in Fig. 1 of the drawings.

Superimposed upon each angle bar 11 is a member 12 forming a runway for an endless chain or conveyer 13.

The horizontal portion of each angle bar 11 extends inwardly beyond the inner edge of the members 12 and forms a runway for the rollers 14 of a plurality of movable carriages 15.

Each carriage 15 is provided with end plates 16 each having a central opening therein adapted to receive the pin 17 extending inwardly from the conveyer chains 13.

Each end member 16 is provided on its outer face with a vertical slot 18 the purpose of which will be hereinafter described.

Interposed between the longitudinal side rails 19 of each carriage 15 is a cross bar 20 located midway of the length of said carriage.

In the cross bar 20 is disposed a ballbearing 21 for a revoluble vertical shaft 22, the upper end of which is squared as indicated at 23.

Fitting over the squared upper end 23 of each vertical shaft 22 is the hub 24 of a supporting plate 25.

Superimposed upon the supporting plate 25 and secured thereto is a tray 26 having upwardly extending flanges 27 at the edges thereof. The bottom of each tray is preferably composed of a plurality of longitudinal bars 28 having cross bars 29 superimposed thereon thereby leaving open spaces between said bars 28 and 29 through which the air is free to circulate.

From the hub 24 to the outer edges of the tray 26 are a plurality of braces 30.

The lower end of the hub 24 rests upon the ball race 31 positioned within a recess in the upper part of the cross bar 20.

Secured to the vertical shaft 22 beneath the cross bar 20 is a brake wheel 32.

Beneath the brake wheel 32 and revoluble with the shaft 22 is a gear 33 and a pinion 34.

The lower end of the shaft 22 has secured thereto an elongated bar 35 having rollers 36 in the opposite ends thereof.

Each cross bar 20 has a lateral ear 37 extending therefrom having revolubly mounted in the outer end thereof a short shaft 38 to the lower end of which is secured a pinion 39 meshing with the gear 33.

At spaced intervals, the angle bars 11 have secured to the upper faces thereof, connecting bars 40.

Midway of their length, these bars 40 have depressed vertical portions 41 and 42.

The vertical portions 41 of the bars 40 connected to tracks 11$^b$, have secured thereto brackets 43 supporting a rack 44, the teeth of which are adapted to mesh with the teeth of the pinion 34 as the carriages 15 are moved lengthwise of said rack by means of the chain conveyers 13.

The vertical portions 42 of the bars 40 connected to the tracks 11$^a$ and 11$^c$ are similarly provided with brackets 43 supporting racks 44, the teeth of which are adapted to engage with the teeth of the pinion 34 when the various carriages 15 are moved lengthwise of said racks 44.

The cross bars 40 connected to the tracks 11$^d$ are also provided with vertical portions 45 which have secured thereto, a rack 47, the teeth of which are adapted to engage with the pinion 39 when the various carriages are moving longitudinally of said lower tracks 11$^d$.

One end of the upper track 11$^a$ is connected to the lower track 11$^d$ by means of a vertical track 48.

The opposite end of the upper track 11$^a$ is connected by a vertical track 49 to one end of the track 11$^b$. The opposite end of the track 11$^b$ is connected by a vertical track 50 to one end of the track 11$^c$, the opposite end of which is connected by the vertical track 51 to one end of the lower track 11$^d$.

At the end of the horizontal tracks are sprocket wheels 52 over which the endless conveyers 13 are adapted to move in the direction of the arrow $a$ on Fig. 1 of the drawings.

Both conveyer chains 13 are driven by means of sprocket wheels 53 secured to a shaft 54 revoluble by any suitable means in the direction of the arrow $b$ on Fig. 11 of the drawings.

The right hand ends of the tracks 11$^b$ and 11$^d$ as viewed in Fig. 1 of the drawings, and the left hand end of the tracks 11$^c$, have curved upward extensions 55 as shown in Fig. 11 of the drawings.

Secured to said tracks 11$^b$, 11$^c$ and 11$^d$ are brackets 56 having curved ribs 57 adapted to coöperate with the curved extensions 55 to maintain the carriages 15 and trays 26 horizontal when the carriages 15 are being moved upwardly preparatory to traveling in the opposite direction upon tracks at a higher level.

The front and rear side members 19 of the carriages 15 are provided with a pair of rollers 58 at each end thereof.

When either of the carriages 15 reaches the farther end of the tracks 11$^b$, 11$^c$ and 11$^d$, the front rollers 58 will come into contact with the extensions 55 and cause the front ends of the carriages to be raised coincident with the raising of the central pivot 17 of said carriages by means of the conveyer chains 13.

During this raising or lifting of the carriages 15, the ribs 57 and the extensions 55 will coöperate to prevent any movement of said carriages 15 about the pivotal connections 17.

After the carriages have been lifted a predetermined distance, the lower end of a rib 59 will enter the vertical slot 18 in the end of the carriages 15.

During the further vertical movement of the carriages they are maintained in a horizontal position by means of this rib 59 extending into said slot 18.

On the upper end of the ribs 59 are rollers 60 which are adapted to support the carriages 15 as they reach the upper turning point preparatory to traveling in the opposite direction on an upper track.

After the carriages 15 reach the upper turning point and the rib 59 is removed from the slot 18, one set of rollers 58 will come into contact with a curved rib 61 along which they will travel, this rib preventing any movement of the carriages about their pivotal connection with the chain conveyer 13.

A curved extension 61$^x$ on the upper tracks coacting with the rollers on the opposite side of the carriage 15 assists in maintaining said carriages horizontal.

By means of these devices during the travel of the carriages 15 from one level to another, the carriages and the tray supported thereby are maintained in a horizontal position at all times.

Similar provision is made for maintaining the carriages level as they move downwardly along the track 48.

The trays 26, as shown, are adapted to be used for cooling chocolate and similar material.

These trays 26 may be lifted from the squared upper ends 23 of the shafts 22 and other trays of a different character substituted therefor in case it is desired to cool some other kind of confections.

When a tray 26 reaches the left end of the tracks 11$^a$ as viewed in Fig. 1, the confections or other similar materials to be cooled are placed in the tray and then these trays are conveyed downwardly in the direction of the arrow $a$ to the lower track 11$^d$.

When a carriage 15 has been moved a short distance along the lower track 11$^d$, the pinion 39 will come into engagement with the rack 47 and the shaft 22 will be caused to rotate thereby, thus moving the confections or other materials in the tray against the air thereby effecting the cooling of the material.

As the material is in soft condition when first placed upon the tray, the rotation of the trays while on the lower tracks 11$^d$ is comparatively slow but when the carriage reaches the second level and moves along the tracks 11$^c$, the pinion 34 comes into engagement with the rack 44 and thereby causes the trays to be rotated with greater rapidity.

The trays 26 are rotated in one direction while moving along the tracks 11$^d$ and in the opposite direction when moving along the tracks 11$^c$.

In other words, as the carriages move from a lower level to an upper level, they are rotated alternately in opposite directions when traveling along the various horizontal tracks on the different levels.

Every alternate shaft 22 is longer than the other intermediate shafts thereby causing every other tray supported thereby to be raised above the other trays so that as the various trays are rotated, the ends thereof will not conflict with each other in their rotation.

Before each carriage reaches the farther end of one of the horizontal tracks preparatory to being lifted onto the track immediately above, it is necessary first to retard the rotation of the tray and then register the same so that it will be possible to have said tray carried by its carriage upwardly without interfering with any of the other parts of the machine.

This retarding movement is accomplished by means of the brake drum 32 coming into contact with a spring finger 62 secured to the vertical portion 41 of the connecting bars 40 which spring will retard the rotation of the shaft 22 and the tray 26 supported thereon.

When the rotary movement of the shaft 22 and tray 26 has been retarded sufficiently the rollers 36 will come into contact with the inclined wall 63 of a cam member 64 secured to vertical portions 42 of the cross bars 40.

This cam member 64 being fixed and the carriages 15 being movable, the rollers will ride up the inclined wall 63 until both rollers are in contact with the straight longitudinal surface 65 of said cam member.

As the rollers 36 move along this straight surface 65, further rotation of the shaft will be prevented and the carriages 15 will be registered in a position extending transversely of the machine and retained in this position until the carriages are lifted to a higher level.

Heretofore in the cooling of confections, the cooling is effected by slowly traveling on a conveyer in a cool room.

In order to cool the confections effectually a large machine is required which occupies considerable valuable floor space.

One of the main objects of the present invention is to accomplish the cooling more rapidly in a machine occupying considerable less room and this is accomplished by mounting the confection-supporting trays upon movable carriages which are provided with devices for rotating the trays at varying speeds during the travel of the carriages.

The required cooling is also accomplished much more rapidly than in machines where the trays are slowly moved on endless conveyers without any provision for the rotation of said trays.

It is believed that the operation and the many advantages of the invention will be thoroughly understood without further description.

Having thus described our invention, we claim:

1. In a device of the class described, a traveling carriage; a vertical shaft rotatable thereon; a tray on said shaft; and means for rotating said shaft.

2. In a device of the class described, a traveling carriage; a vertical shaft rotatable thereon; a tray on said shaft; a gear on said shaft; and a fixed rack with which said gear coacts during the travel of said carriage.

3. In a device of the class described, a traveling carriage; a vertical shaft rotatable thereon; a tray on said shaft; and means for rotating said shaft at different speeds.

4. In a device of the class described, a traveling carriage; a vertical shaft rotatable thereon; a tray on said shaft; two gears of different sizes on said shaft; means actuating first one gear and thereby imparting rotary movement to said shaft for a predetermined time; and other means for actuating the other gear when the first-mentioned actuating means is not in operation.

5. In a device of the class described, a traveling carriage; a vertical shaft rotatable thereon; a tray on said shaft; two gears of different sizes on said shaft; a rack engaging one gear during the travel of said carriage; and another rack for actuating the other gear subsequently in the travel of the carriage.

6. In a device of the class described, a traveling carriage; a vertical shaft rotatable thereon; a tray on said shaft; means for rotating said shaft; and means for subsequently retarding the rotation of said shaft.

7. In a device of the class described, a traveling carriage; a vertical shaft rotatable thereon; a tray on said shaft; means for rotating said shaft; a brake drum on said shaft; and a yielding member adapted in the travel of the carriage to engage said drum and retard the rotation of said shaft.

8. In a device of the class described, a traveling carriage; a vertical shaft rotatable thereon; a tray on said shaft; means for rotating said shaft; and means at predetermined points in the travel of said carriage for preventing the rotation of said shaft.

9. In a device of the class described, a traveling carriage; a vertical shaft rotatable thereon; a tray on said shaft; means for rotating said shaft; a flat-sided member secured to said shaft; and a fixed cam adapted to coact with said flat-sided member at definite points in the travel of said carriage to prevent the rotation of said shaft.

10. In a device of the class described, a traveling carriage; a vertical shaft rotatable thereon; a tray on said shaft; means for rotating said shaft; and means at predetermined points in the travel of said carriage for retarding the rotation of said shaft and subsequently preventing further rotation thereof.

11. In a device of the class described, a plurality of tracks at different levels; a plurality of carriages movable on said tracks; revoluble trays on said carriages; means for revolving said trays and means at the ends of said tracks to maintain said carriages horizontal while moving from one level to another.

12. In a device of the class described, a plurality of tracks at different levels; a plurality of carriages movable on said tracks and having slots in the ends thereof; revoluble trays on said carriages; means for revolving said trays and vertical guide bars at the ends of said tracks adapted to enter said slots to maintain said carriages horizontal while moving from one level to another.

13. In a device of the class described, a traveling carriage; a vertical shaft rotatable thereon; a tray on said shaft; and means for alternately rotating said shaft in opposite directions.

14. In a device of the class described, a plurality of traveling carriages; a vertical shaft rotatable on each carriage; trays secured to and rotatable with said shaft, alternate trays being at a higher level than the others; and means for rotating said shafts.

15. In a device of the class described, a framework having a plurality of tracks at different levels, each track having upper and lower runways; endless conveyers on the upper runways; movable carriages pivotally connected at opposite ends to said conveyers; rollers on said carriages movable on said lower runways; and a confection-supporting tray on each carriage.

16. In a device of the class described, a framework having a plurality of tracks at different levels, each track having upper and lower runways; endless conveyers on the upper runways; movable carriages pivotally connected at opposite ends to said conveyers; rollers on said carriages movable on said lower runways; a confection-supporting tray revolubly mounted on each carriage, and means for revolving said tray.

17. In a device of the class described, a framework having a plurality of tracks at different levels; endless conveyers on said tracks; rectangular carriages pivotally connected at their ends with said conveyer; a ball bearing centrally disposed in each carriage; a revoluble shaft in each bearing; a tray secured to the upper end of said shaft; and means coacting with the lower end of said shaft for imparting rotary movement thereto during the travel of said carriage.

18. In a device of the class described, a framework having a plurality of tracks at different levels; endless conveyers on said tracks; rectangular carriages pivotally connected at their ends with said conveyer; a ball bearing centrally disposed on each carriage; a revoluble shaft in each bearing; a tray secured to the upper end of said shaft; a gear on the lower end of said shaft; and a fixed rack with which said gear is adapted to engage during the travel of said carriage.

19. In a device of the class described, a framework having a plurality of tracks at different levels; endless conveyers on said tracks; rectangular carriages pivotally connected at their ends with said conveyer; a ball bearing centrally disposed in each carriage; a revoluble shaft in each bearing; a tray secured to the upper end of said shaft; two gears of different sizes at different levels on the lower end of said shaft; and two fixed racks one of which is adapted to impart rotary movement to one of said gears and the other of which is adapted to subsequently impart rotary movement to the other gear.

20. In a device of the class described, a framework having a plurality of tracks at different levels; endless conveyers on said tracks; rectangular carriages pivotally connected at their ends with said conveyer; a ball bearing centrally disposed in each carriage; a revoluble shaft in each bearing; a tray secured to the upper end of said shaft; a gear on the lower end of said shaft; a fixed rack with which said gear is adapted to engage during the travel of said carriage; and means operable at predetermined times for arresting the rotation of said shaft and positioning the tray thereon preparatory to movement from one level to another.

21. In a device of the class described, a traveling carriage; a vertical shaft rotatable thereon and having a flat-sided upper end; means for rotating said shaft; and a tray having a depending socket adapted to fit the upper end of said shaft.

22. In a device of the class described, a traveling carriage; a vertical shaft rotatable thereon and having a flat-sided upper end; means for rotating said shaft; and an open work tray having a depending socket adapted to fit the upper end of said shaft.

23. In a device of the class described, a traveling carriage; a vertical shaft rotatable thereon and having a flat-sided upper end; means for rotating said shaft; and a tray having a depending socket adapted to fit the upper end of said shaft and provided with a vertical edge flange.

24. In a device of the class described, a traveling carriage; a rotatable vertical shaft thereon; a tray supported thereby; a gear on said shaft; a fixed rack meshing with said gear during the travel of said carriage; a bar secured to the lower end of said shaft perpendicular to the length of said tray; and a fixed cam coacting with said bar at a predetermined point in the travel of said carriage and adapted to prevent the rotation of said shaft for a predetermined time.

25. In a device of the class described, a traveling carriage; a rotatable vertical shaft thereon; a tray supported thereby; a gear on said shaft; a fixed rack meshing with said gear during the travel of said carriage; a bar secured to the lower end of said shaft perpendicular to the length of said tray having rollers in the opposite ends thereof; and a fixed cam coacting with said bar at a predetermined point in the travel of said carriage and adapted to prevent the rotation of said shaft for a predetermined time.

26. In a device of the class described, a traveling carriage having a vertical slot in one end thereof; parallel horizontal tracks for said carriage, the lower of said tracks having a curved upward extension; a vertical guide above said lower track adapted to coact with said slot; and a projection on said carriage coacting with said curved extension to maintain the carriage level while said carriage is being raised and said guide is entering said slot.

27. In a device of the class described, a traveling carriage having a vertical slot in one end thereof; parallel horizontal tracks for said carriage, the lower of said tracks having a curved upward extension; a vertical guide above said lower track adapted to coact with said slot; and a revoluble member on said carriage coacting with said curved extension to maintain the carriage level while said carriage is being raised and said guide is entering said slot.

28. In a device of the class described, a traveling carriage having a vertical slot in one end thereof; parallel horizontal tracks for said carriage; a vertical guide member above the lower track adapted to coact with said slot; and means for maintaining said carriage level while said carriage is being lifted so that said guide member will enter said slot.

29. In a device of the class described, a traveling carriage having a vertical slot in one end thereof; parallel horizontal tracks for said carriage, the lower of said tracks having a curved upward extension; a vertical guide above said lower track adapted to coact with said slot; rollers on the front side of said carriage coacting with said curved extension; rollers on the rear side of said carriage; and curved tracks with which said rear rollers coact.

30. In a device of the class described, a traveling carriage having a vertical slot in one end thereof; parallel horizontal tracks for said carriage, the lower of said tracks having a curved upward extension; a vertical guide above said lower track adapted to coact with said slot; a roller on the top of said vertical guide; rollers on the front side of said carriage coacting with said curved extension; rollers on the rear side of said carriage; and curved tracks with which said rear rollers coact.

Signed by us at 746–7 Old South Bldg., Boston, Mass., the 31st day of January, 1920.

FREDERICK W. LEYLAND.
EDWARD P. BROCK.

Witnesses:
WALTER E. LOMBARD,
NATHAN C. LOMBARD.